United States Patent Office 3,736,223
Patented May 29, 1973

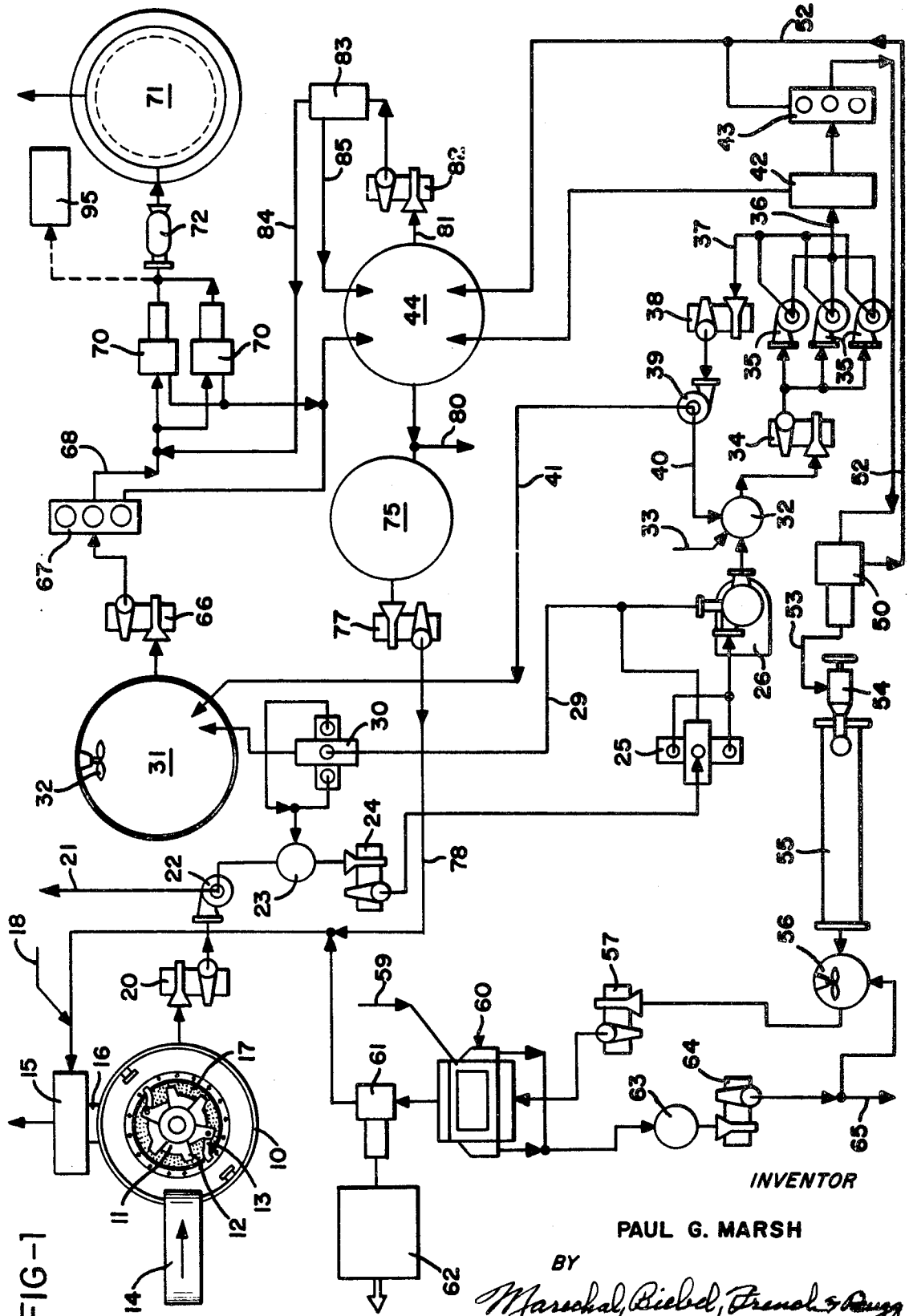

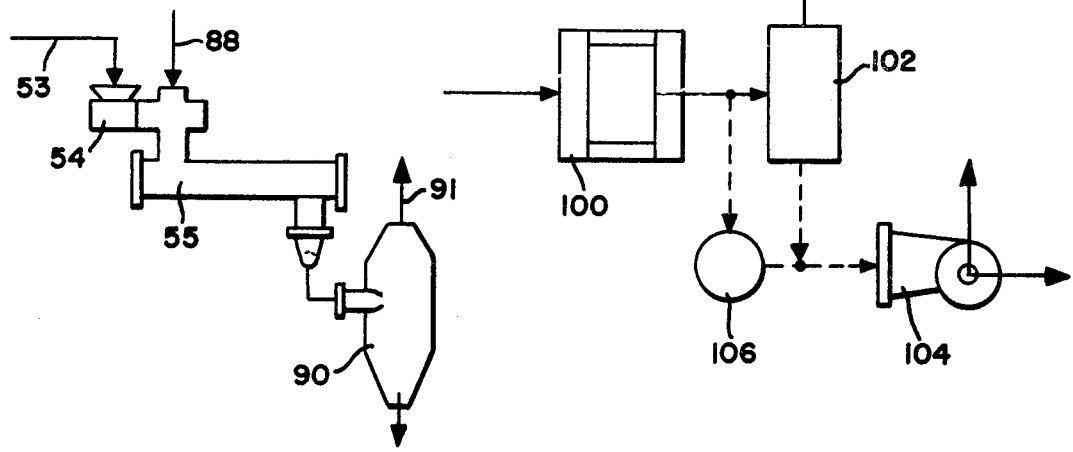
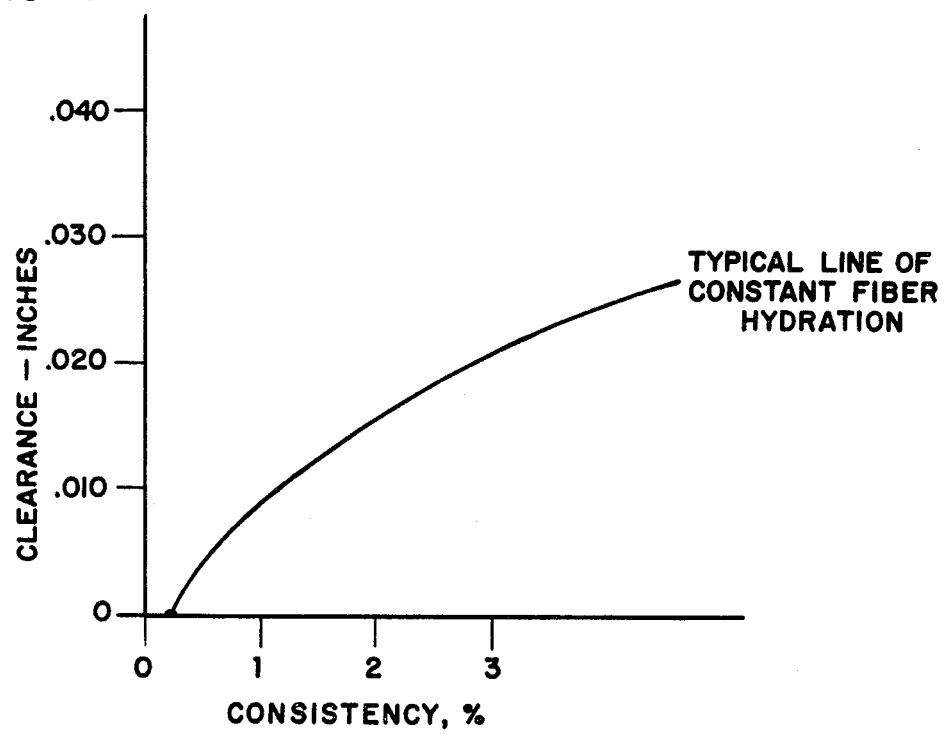

3,736,223
WASTE TREATMENT AND FIBER
RECLAMATION SYSTEM
Paul G. Marsh, Hamilton, Ohio, assignor to The Black
Clawson Company, Hamilton, Ohio
Continuation-in-part of abandoned application Ser. No.
14,431, Feb. 26, 1970. This application Dec. 1, 1970,
Ser. No. 94,084
Int. Cl. D21b 1/08
U.S. Cl. 162—4       13 Claims

ABSTRACT OF THE DISCLOSURE

A process for recovering reusable papermaking fiber from municipal refuse includes mixing the refuse with liquid in a treatment vessel and reducing the relatively frangible portions of the refuse by subjecting the mixture to hydraulic and mechanical shear while separately removing relatively infrangible portions from the vessel. The resulting slurry of frangible refuse and water is centrifugally cleaned to remove inorganics such as glass, and the centrifugally cleaned slurry is then screened to separate reusable papermaking fibers from the fine fibrous material and other organics, in excess of 25% of the paper fibers being rejected with the screened materials. The latter, which will usually be rich in synthetic resins, may then be treated under heat and pressure to produce hardboard, or merely dewatered and burned. The fibers separated from the other portions of the slurry may be classified by means of a fiber selector, subjected to further centrifugal cleaning and dewatered, and the resulting dewatered fiber subjected to additional treatment such as digestion, deinking, bleaching, floatation and washing to upgrade the quality of the fiber for subsequent reuse. Additionally, the slurry may be treated by refining equipment operating at low consistency and tackle clearances and then subjected to froth flotation and/or further centrifugal cleaning. The inorganics removed by centrifugal cleaning, as well as the relatively infrangible portions of the refuse, may be further classified for reuse, particularly the metal and glass fractions, or they may be disposed of by landfill methods.

CROSS REFERENCE TO RELATED APPLICATIONS

This application is a continuation-in-part of application Ser. No. 14,431, filed Feb. 26, 1970 and entitled Waste Treatment and Fiber Reclamation, now abandoned.

Additional related applications are: Method for the Treatment of Garbage and Other Wastes, Ser. No. 719,197, filed Apr. 5, 1968, now abandoned for continuation Ser. No. 6041, now Pat. No. 3,549,092, Waste Treatment System, Ser. No. 861,778, filed Sept. 29, 1969, now Pat. No. 3,595,488, and Selective Recovery of Paper Fibers from Municipal Wastes, Ser. No. 19,019, now abandoned, filed Mar. 12, 1970.

BACKGROUND OF THE INVENTION

With the continuing increase in both population and per capita production of refuse, the problem of disposing of refuse is becoming a matter of increasing concern. For example, while the population of the United States has increased in the past fifty years from approximately 105 million to over 200 million, the per capita production of refuse in the United States has risen from a little over 2.5 pounds per day in 1920 to almost 5 pounds per day in 1970.

Traditionally, a major proportion of this refuse has been disposed of by either incineration or landfill while lesser amounts have been disposed of by methods such as dumping at sea and composting. Conventional incineration as a method of disposal, however, has met increasing resistance since it often results in pollution of the surrounding atmosphere with noxious fumes and fallout unless expensive and complicated gas treatment devices are utilized. Similarly, for conservation reasons disposal by dumping at sea is considered a less than desirable alternative. Accompanying the increase in population has been a parallel increase in the value of land. As a result, the expenditure required to acquire sufficient land for landfill purposes is becoming less and less economically feasible. Lastly, composting, although it has been known for hundreds of years and has receive intensive consideration for the past twenty to thirty years, has, for a variety of reasons, never become accepted as a primary method of disposing of refuse.

At the same time that both population and the per capita production of refuse have been increasing, the consumption of paper products has also shown a dramatic rise. Largely accountable for this rise has been the supplanting of metal, wood and glass as packaging materials by paper and the increased use of paper disposables such as paper cups, plates, napkins, and, in more recent years, garments and bedding. As a result, the proportion of municipal refuse constituted by paper products presently approaches, and in all likelihood will soon exceed, half of the total amount of such refuse. Thus the composition of typical municipal refuse by undried weight has recently been analyzed by American Paper Institute as follows:

| | Percent |
|---|---|
| Paper | 46 |
| Garbage | 12 |
| Grass and dirt | 10 |
| Glass, ceramics and stones | 10 |
| Metal | 8 |
| Wood | 7 |
| Textiles | 3 |
| Plastic film | 2 |
| Leather, molded plastic and rubber | 2 |

Analysis on an oven dry basis of municipal refuse treated in the development of the present invention indicated the following fractions:

Group I (Inorganic)

| | Percent |
|---|---|
| Glass and ceramics | 13.5 |
| Metal | 11 |
| Dirt | 3 |

Group II (Organic except paper)

| | |
|---|---|
| Wood | 1.5 |
| Grass and other vegetation | 3.5 |
| Low Density plastics | 3.0 |
| Textiles | 2.0 |
| Molded plastic, leather and rubber | 3.0 |
| Garbage (insoluble) | 3.5 |
| Garbage (soluble) | 4.0 |
| Group III (Paper) | 52 |
| | 100.0 |

It will be seen, therefore, that the increase in both population and per capita production of refuse and the increased consumption of paper products present two problems which, based upon present projections, promise to become increasingly critical. Thus, the increased amount of refuse which must be disposed of renders conventional disposal methods less and less acceptable, while the necessity of developing greatly improved disposal techniques becomes increasingly critical as a result of the sheer volume of refuse being produced. At the same time, the dramatic rise in per capita consumption of paper products in the United States inevitably leads to the conclusion, backed by statistical analysis, that in the foreseeable future, the supply of virgin raw material will be exceeded by the requirements of the paper industry.

SUMMARY OF THE INVENTION

In accordance with the present invention, muncipal refuse of the disparate character noted above is broken down into its various components or, in some cases, combinations of components, so that appreciable portions of the refuse are converted to useful products, and the remainder of the refuse is converted to forms amenable to ready disposal by a variety of methods. In particular an appreciable portion of the fibrous material, which constitutes the single largest component of the refuse, is reclaimed for reuse, thereby not only drastically reducing the amount of refuse which must be disposed of as waste, but at the same time providing a significant source of raw materials to satisfy the ever increasing consumption of paper products.

As a result, the present invention simultaneously provides a solution to both problems discussed above by, in effect, utilizing each problem to solve the other. Thus the increasing amount of refuse being generated provides a source of raw material for the paper industry to satisfy its increasing requirements, while the reclamation of fiber from refuse appreciably decreases the problem of waste disposal.

It has been suggested in the past that paper can be recovered from refuse wastes by a separating step performed in the dry or semi-dry state, for example, by a manual separating action or by air jets. In contrast, the practice of the present invention involves a wet process commencing with treatment of commercial refuse in aqueous suspension with a solids content of the order of 6%. This suspension is subjected to substantial and violent mechanical and hydraulic shear forces which reduce the frangible portions to particle sizes below a predetermined maximum. In the course of this initial treatment, the infrangible materials are readily removed from this suspension by appropriately controlled gravity action, and whatever stringy materials are not comminuted can also be separately removed.

The remaining original constituents of the refuse are transformed into an aqueous slurry which includes substantially all of the fibrous material along with most of the other materials listed above, except for a large part of the metal and perhaps the stringy materials, and in which the particles range in size up to approximately 1". The present invention is particularly concerned with the separation of this slurry into predetermined fractions of its original components and as much reusable paper fiber as possible in sufficiently clean condition for reuse. The major steps by which these results are accomplished may be summarized as follows:

(a) A centrifugal cleaning step to remove most of the balance of the inorganic materials which compose Group I above. The accepted material from this step is therefore primarily composed of paper and Group II materials listed above.

(b) Relatively coarse screening, for example, with ⅛" holes, and advantageously with some defibering action. A relatively large fraction of the coarsest should be removed in this step.

(c) A finer screening step to reject organic particles accepted in the preceding step, for example, by means of 1⁄16" perforations. On the average, as large a percentage of the original materials, including fibers, is rejected in this step as in step (b).

(d) A centrifugal cleaning step designed to romove remaining high specific gravity particles and particularly directed to the elimination of particles of similar maximum dimensions and specific gravities but having irregular shapes as compared with paper fibers, such as coffee grounds, wood slivers, vegetation and particles or rubber, leather and plastic.

(e) A fiber selecting step, which is optional, directed to retention of a sufficient proportion of the relatively long fibers suitable for papermaking to establish an average length for the accepted fibers in the middle or preferably the higher portion of a range of .5 to 3.5 millimeters. A substantial portion of otherwise usable fiber should be rejected in this step in order to eliminate as much of the remaining garbage and vegetation as possible.

Additionally a digesting step may be performed in which the remaining accepted material is subjected to heat and also possibly to a digesting agent for the purposes of elimination of any remaining nonfibrous constituents as well as sterilization of the paper fibers.

A further step which is particularly effective where a high proportion of hairy materials, threads and light vegetable products such as leaves and grass are found is treatment in refining equipment at relatively low consistencies and tackle clearances followed by a flotation separation step and/or further centrifugal cleaning.

It is of particular importance to note in connection with each of the steps outlined above that for optimum results from the standpoint of quality of the ultimate product, it is usually necessary to reject a substantial portion of the paper fiber in the course of each step. While this statement may seem contrary to the ultimate purpose of the invention, the fact is that there is so close a relationship in size and specific gravity between the fibers to be retained and some of the particles to be eliminated that attempts to obtain maximum recovery of paper fibers tend to result in the retention of an unacceptably large portion of undesirable material, particularly particles of plastic, vegetation and textile fibers. Anomalous as it may seem, extensive experimentation in the development of this invention indicates that if in excess of 25%, and in some cases as high as 60%, of the paper fibers originally present in the slurry are eliminated in the course of the cleaning and screening steps, the retained fibers will be of a sufficiently high quality to warrant that amount of rejection. In contrast, if it is attempted to retain a significantly higher proportion of the paper fibers, the end product as a whole will be of such lower quality that the market for its reuse may not justify its recovery cost.

The invention accordingly offers the very practical advantage of substantial recovery of useful material from refuse which currently is almost universally disposed of as wastes, and it has additional advantages with respect to the fractions of the starting refuse which are separated from the paper fibers. Thus the heavy metals initially removed in the course of the pulping step can be salvaged, and the gritty constituent removed in the first centrifugal cleaning step may also have salvage value, for example, as aggregate. Alternatively, in areas where glass is the major constituent of the gritty materials, it may be salvaged for its own value, and any such salvage operation in a condition which is relatively clean and free from contaminating materials. Obviously these gritty materials can also be easily disposed of as landfill, and their relatively sanitary condition makes them particularly useful for localized fill purposes, such as building operations, for which they could not be used if mixed with other materials as part of untreated refuse.

The fractions which are rejected in the successive screening steps, and particularly the rejected material from steps (b) and (c), can be used by themselves as source material for usable products such as building board. This result is enhanced by the fact that these rejected fractions contain a relatively high proportion of thermoplastic resins which have a strong bonding effect on the retained paper fibers under heat and pressure to produce a relatively hard and stable board product. If, however, the particular community practicing the invention prefers to dispose of this material by combustion, this treatment also is easy to carry out after sufficient dewatering, and both the retained fiber and the plastic contribute to this result.

The invention accordingly provides, and its main object is to provide, methods and apparatus for the treatment of municipal wastes which result in substantial recovery of paper fibers and which result also in separation of the major other components of municipal wastes into fractions which are either readily adapted for reuse or which are in particularly advantageous condition for ultimate disposal as waste.

BRIEF DESCRIPTION OF THE DRAWING

FIG. 1 is a flow diagram illustrating the apparatus and process steps of the present invention;

FIG. 2 illustrates a modification of the process and apparatus of FIG. 1;

FIG. 3 shows a further modification of the process and apparatus of the present invention; and FIG. 4 illustrates graphically the desired relationship between tackle clearance and slurry consistency when passing the slurry through a refiner or the like.

DESCRIPTION OF THE PREFERRED EMBODIMENTS

As seen in FIG. 1, a system according to the present invention includes a treatment vessel 10 having a rotor 11 rotatably mounted therein and carrying outwardly projecting arms 12 which in turn carry pivotally mounted hammers or flails 13. A conveyor 14 is provided for carrying refuse to the vessel 10, and a junk remover 15 is positioned adjacent the vessel and in communication therewith by means of the conduit 16. An extraction plate 17 is mounted in the bottom of vessel 10 and is provided with perforations of predetermined size so that only particles of sizes sufficiently small to pass therethrough are extracted to a discharge chamber (not shown) therebelow. At this stage, it is desirable to extract relatively large particles, and holes of 1" diameter in the plate 17 have been found satisfactory. The equipment thus far described may be of the same general type as that described in the above noted applications Ser. Nos. 861,778, 719,197 and 19,019 and it reduces the waste to an aqueous slurry containing all of the original waste except the heavy reject removed by junk remover 15 and whatever stringy materials are effectively removed from vessel 10.

In operation, the conveyor 14 continuously deposits municipal refuse in the vessel 10 where it is treated by the rotor with the flails or hammers 13 on its arms 12. The refuse deposited in the vessel 10 will consist of fibrous materials such as paper, textiles, grass and wood, non-fibrous organic material such as plastic film, leather, molded plastic, rubber and garbage and inorganic such as dirt, glass, ceramics, stones and metal. Liquid is supplied by a line 18 through the junk remover 15 and its connecting conduit 16 into the vessel 10 and the arms 12 and hammers or flails 13 subject the resulting mixture of refuse and liquid to substantial and violent mechanical and hydraulic shear forces and thereby comminute the relatively frangible portions of the refuse.

Relatively infrangible materials, such as iron castings, metal cans and the like, are removed separately from the vessel 10 by means of the junk remover 15 for disposal by any convenient means such as landfill, and the supply of liquid by way of the junk remover 15 tends to wash fiber and other light material back into vessel 10 so that the removed metal is relatively clean. Of course, salvageable metals such as copper, lead, ferrous products, etc., may be removed before disposal of the remainder of the infrangibles. The remaining, relatively frangible materials are comminuted by the arms 12 and flails 13 and the hydraulic shear forces set up in the vessel until they are of sufficiently small size to pass through the openings in the extraction plate 17 in the bottom of the vessel 10.

The materials extracted from vessel 10 in aqueous slurry form are pumped by a pump 20 to a centrifugal cleaner 22, which performs step (a) as outlined above. That is, it separates substantially all of the inorganics, such as metals, glass and stones from the remainder of the slurry, and in practice will on the average be approximately equal to that removed by the junk remover 15. The rejects are conveyed from the cleaner 22 as indicated at 21 for disposal either by landfill methods or for example, use as an aggregate in concrete or asphalt. Additionally, the glass may have salvage value as cullet.

The accepted material from the cleaner 22, which includes substantialy all of the organic materials, is passed to a holding tank 23 from which a pump 24 delivers the slurry to coarse screening apparatus 25, and the accepted slurry from the coarse screen 25 is passed onto a relatively fine screen 16. The screen 25 may be of the same general type as that shown in Pat. No. 2,033,123, while screen 26 may be of the type shown in Pat. No. Re. 24,677, although it will be apparent that other types of screening equipment may be utilized to perform the successive coarse and fine screening steps (b) and (c) as outlined above.

In operation, the screen 25 will separate a substantial portion of the reusable papermaking fibers in the slurry from the other constituents, such particularly as a major part of the wood and other vegetation, textiles, plastic, coarse food wastes, metal foil, rubber, leather and undefibered wet strength paper. These reject materials are indicated as carried by a conduit 29 to a secondary screen 30. As previously noted, satisfactory results have been obtained with a screen 25 having an effective retaining action on particles larger than about .125 inch in any direction, and it should also be noted that the screen 25 may advantageously be of a type which will impart some difibering action to bundles of reusable fibers in the course of its screening action.

The finer screen 26 will remove reject particles similar to those removed by the screen 25 but which are of too small particle sizes to be retained by the screen 25. Thus as already noted, if the perforations in coarse screen 25 are of the order of .125 inch, those in fine screen 26 may be .0625 inch in diameter. The rejects from the screen 26 are also conveyed by the conduit 29 to the secondary screen 30. Accepts from screen 30 are shown as returned to the holding chest 23 for recirculation through screens 25 and 26, while rejects from screen 30 are conveyed to an agitator chest 31 provided with an agitator 32.

Screens 25 and 26 are preferably selected such that the fibers which pass these two screens include most of those having a length in the range of .5–3.5 millimeters, and that undefibered rags, long synthetic fibers, etc., are rejected, particularly by screen 25, but the accepted stock also includes substantially all of the short fibers and fines. If it is desired to reduce the proportion of these fines and other small particles having a maximum dimension of less than 1 millimeter, fiber selector means are utilized which will accept the longer fibers and will reject fines and other small particles. The fiber selector may be positioned downstream of the screen 26 to receive the accepts therefrom, but preferably the accepts first pass to a series of centrifugal cleaners.

Thus, a holding tank 32 receives the accepts from screen 26 and make up water from a water supply 33 and a pump 34 pumps material from the holding tank 32 to a bank of centrifugal cleaners 35. Cleaners 35, which are connected in parallel, deliver accepted material to a common discharge conduit 36. The cleaners 35 are of the same general type as the cleaner 22, which removed substantially all of the inorganics, but are designed to impart higher centrifugal forces to remove not only the relatively small portion of fine inorganics such as glass, metal, dirt and sand which passed a cleaner 22, but also odd-shaped organic particles similar in specific gravity and such as coffee grounds, wood slivers, vegetation, particles of rubber, leather and the like. These reject materials are conveyed from the cleaners 35 by a common line 37 and a pump 38 to secondary centrifugal cleaners 39 (one being shown) from which the accepts are recirculated through a line 40 back to the holding chest 33, and the rejects are carried by a line 41 to the agitator chest 31.

The accepted slurry from the cleaners 35 is delivered by line 36 to fiber selecting apparatus 42 of any suitable construction which is effective to select relatively long fibers from a slurry of fibers of various lengths and other particulate materials. Reference may be had to Weber Pat. No. 1,786,973, issued Dec. 30, 1930 for several types of apparatus for this purpose. Satisfactory results have also been obtained with various thickening devices used in the papermaking industry and provided with a screening member havng perforations or slots sized to retain fibers of the desired range of lengths while passing fines of all kinds as reject, for example, 80 mesh perforations. The slurry is preferably delivered to the selecting apparatus 42 at a dilute consistency and the retained accepted stock is transmited to a dewatering device 43 while the reject is passed to a clarifier chest 44 to which further reference is made hereinafter.

As noted above, the fiber selector 42 is utilized only if fibers to be reclaimed are desired to have an average length in a particularly high range. Otherwise, the fiber selector 35 is unnecessary. It should also be noted that although the fiber selector 42 is illustrated as positioned downstream of the cleaners 35, it may be positioned instead upstream of these cleaners. If positioned upstream, the load on the cleaners is less, but if positioned downstream, the cleaners will remove some fines and the load on the selector will be less. Additionally the fiber selector has a dewatering effect. Since the centrifugal cleaner 35 operate at low consistences it would be necessary to dilute the accepts from the fiber selector before feeding them to the cleaners 35. Also, the material delivered to thickener 43 should be prethickened to avoid undue fiber loss during treatment by the thickener 43. Hence it will usually be preferable to place the fiber selector downstream of the cleaners 35.

The accepted material from the fiber selector 42 is conveyed to the dewatering station 43 and an additional dewatering device 50 connected in series to increase the consistency of the slurry in a two-step process. For example, the device 43 may be of the screw thickened type while the dewatering device 50 may take the form of a dewatering press, and the liquid removed thereby is carried by a common line 52 to the clarifier chest 44. The dewatered material from devices 43-50 is conveyed by line 53 to a suitable feeding device 54 of, for example, the screw feeding type, which delivers the relatively high consistency material to a digester 55 for performing a digesting step as outlined above. Digester 55 is preferably of the continuous type which subjects the material to be treated to heat and superatmospheric steam pressure as it travels therethrough to disperse or dissolve grease, asphalt, printing ink and the like.

It is likely that the material delivered to the digester 55 will contain some residual food waste and vegetation, such as grass clippings, in addition to contaminants like ink, resins and petrochemicals such as asphalt. The action of the digester tends to disperse the latter materials, but if the contaminants remaining in the slurry comprise any substantial amount of food waste and vegetation, it is desirable to add a digestion chemical, such as sodium hydroxide. If the remaining contaminants comprise a significant amount of synthetic resins and/or petrochemicals, the material may be treated in the digester with a volatile solvent such as trichloroethylene which will dissolve the contaminants and cause them to be dispersed in non-objectionable form throughout the fibers when the solvent is flashed off after discharge from the digester.

The material discharged from the digester 55 is conveyed to a holding tank 56 from which it is pumped by a pump 57 to a washer 60 to which water or other washing liquid is supplied at 59. The washed material from the washer 60 is conveyed to a press 61 for dewatering, and thence to a station 62 equipped with a baler or other apparatus by which it is prepared for shipment to a further point, or the station 62 may represent a paper machine when the reclaimed fibers are to be reused, in which case the press 61 would not be needed in the system. The wash liquid from the washer 60 is taken to a holding chest 63 from which some is returned by a pump 64 to the holding tank 56, and the balance is removed from the system at 65 for disposal. The liquid removed by the press 61 is relatively clean, and it may be recycled to other parts of the system for reuse as desired, for example to the vessel 10 as shown.

As noted above, the rejects from the screens 25 and 26 and the centrifugal cleaner 39 are conveyed to an agitator chest 31. Since essentially all of the inorganic materials have been removed from the system by the junk catcher 15 and the centrifugal cleaners 22 and 35, the material deposited in the agitator chest 31 will consist, for the most part, of organic material, although there may be a minor portion of inorganics. The agitator 32 in the chest 31 maintains these solids in suspension, and the suspension is withdrawn from the chest 31 by a pump 66 and pumped to a dewatering device 67, which may conveniently be of the screw thickener type.

The partially dewatered solids from the thickener 67 may be conveyed by a conduit 68 to a bank of presses 70 which serve to dewater the material further in preparation for final disposal by any convenient means, shown as a fluidized bed reactor 71 in combination with a blower 72. Since the material fed to the fluidized bed reactor will be mainly organic materials, oxidation thereof by the reactor will be substantially complete, and only a minor portion of the material will remain after the reaction for further disposal.

Liquid removed by the dewatering decides 43, 50, 67 and 70 will be accompanied by some solid material. Therefore, this liquid is preferably conveyed to the clarifier 44. A major portion of the clarified liquid from the clarifier 44 is conveyed to a water chest 75 from which it is pumped by a pump 77 through a conduit 78 back to the water inlet 18 to the waste treatment vessel 10.

To prevent the liquid recirculated to vessel 10 from becoming too rich in suspended and dissolved solids, a portion of the liquid from clarifier 44 is bled from the system at 80 for disposal. An additional outlet 81 is provided from the clarifier 44 so that relatively high consistency materials from the clarifier may be pumped by a pump 82 to a filter 83. Solid material removed by filter 83 is conveyed by line 84 to the presses 70, from which it may be disposed of by any convenient means such as the fluidized bed reactor 71. Liquid from the filter 83 is returned to the clarifier 44 by the line 85.

As noted above, if the material delivered to the digester 55 includes, in addition to reusable papermaking fibers of the desired size, contaminants in the form of synthetic resinous materials and petrochemicals, it may be desirable to treat the fibers with a volatile solvent such as trichloroethylene prior to washing and further dewatering thereof. FIG. 2 illustrates his modification of the invention the line 53 conveys the fibrous material and contaminates to the screw feeder 54 while trichloroethylene or the like is fed through a line 88 into the digester 55. As the fibers and attached contaminants are mixed with the solvent and travel through the digester, the contaminants are dissolved and dispersed throughout the fibers. The materials from the digester is then passed to a blow tank 90 from which the volatile solvents may be recovered through the line 91 while the fibers with the contaminants dispersed throughout are ejected to the chest 56 for further treatment as above.

It should also be noted that, whereas the material from the presses 70 is described as being oxidized by means of a fluidized bed reactor or the like, this material is high in organic content and might instead be thickened and used as compost or fortified with nutrient and used for animal food. Additionally, as shown in dashed lines in FIG. 1, the material from presses 70 might be conveyed to a heated platen press 95 where it is treated with heat and pressure to form hardboard.

It is been found that relatively large particles of relatively light materials often have a tendency to become entrapped with the papermaking fibers. For example, in treating muncipal wastes in the fall of the year leaves will constitute, for some communities, an appreciable portion of the refuse. Similarly, grass clippings, and trimmings from shrubbery and the like will constitute a portion of the wastes collected during the spring and summer months. These particles and other, hairy material, such as hairs and threads, can be readily taken care of by a step somewhat similar to refining, although with important differences as noted below, followed by a froth flotation separating step and/or a centrifugal cleaning step.

Thus, as seen in FIG. 3, the slurry of material at a relatively low consistency is directed to refining apparatus 100 of, for example, the disc type, operating at relatively narrow clearances between the refiner tackle to cause large particles such as hairs, threads, leaves, blades of grass, etc. to be broken up. Since the fibers of the slurry are separated and the slurry is at a relatively low consistency, even though the clearances in the refining apparatus are quite narrow the papermaking fibers are able to pass through the refining equipment with negligible working thereof while the larger particles of the foreign materials referred to above are broken down into smaller particles. This can be noted with respect to FIG. 4 where it is shown that the refiner can even be run with the tackle, such as opposed refining plates, just touching as long as the consistency is kept well below 1%. Of course, if the tackle clearances are increased the consistency may also be increased, as indicated by the curve of FIG. 4, although at some sacrifice of efficiency in reducing the larger particles. Thus, in order to maintain a relatively constant hydration level the consistency and tackle clearances must be varied as shown. For example, at 3% consistency and .020" plate clearance a freeness of 500 c.s.f. might be obtained. In order to maintain this freeness at .0050 a consistency of 5% would be required.

It will be apparent that the refining step may be performed at a number of places throughout the system shown in FIG. 1 of the drawings. Thus, the material from pump 34, instead of being pumped to the cleaners 35, could be directed to the refiner 100 for treatment as described above. Alternatively, the accepts from the cleaners 35 could be passed to the refiner 100. Preferably, however, the refiner 100 will be positioned downstream of the digester 55 so that any material, such as hair, threads or light vegetable materials remaining after treatment by the unit 55 can be broken up by the refiner 100.

From the refiner 100 the foreign materials which have been comminuted by the refiner 100 and the fibers may be directed to a flotation tank 102 which may operate on well known froth flotation principles, with or without the addition of an appropriate chemical agents to cause at least certain portions of the foreign materials to be separated from the papermaking fibers. The froth flotation step may then be followed by an additional centrifugal cleaning step to further remove any foreign materials, particularly those which were broken up in the refiner and now are easily separated in the centrifugal cleaner 104 from the fibers and ejected therefrom separately from the fibers.

It will be noted that the two-step treatment of the material from the refiner 100 may be unnecessary since the treatment by the flotation unit 102 alone may be enough. Additionally, the material from the refiner 100 may be passed through a holding tank 106 and thence, directly to the centrifugal cleaner 104, thereby bypassing the flotation unit 102. However, since the froth flotation unit may be utilized to separate, not only the foreign materials discussed above but such things as ink, grease, asphalt, etc. it will usually be desirable to include this unit.

The advantages of the system and method of the invention as described above will now in large measure be apparent. In evaluating the invention, it is important to recognize that it is directed to the performance of a task which is essential for every municipal community, namely the disposal of its wastes, which tasks represents a significant part of the cost of maintaining each such community even without the continuing increase in the production of wastes already discussed above. The value of the invention can therefore be measured in terms of the extent to which it contributes to the control or reduction of the costs of waste disposal, and judged on this basis, the invention offers the following advantages.

(1) The material requiring final disposal as waste is reduced to a minimum.

(2) The material requiring final disposal as waste is provided in particularly convenient condition for such final disposal.

(3) The major components of municipal refuse are classified for separate further processing in the most expeditious ways.

(4) Salvage of the heavy components of municipal waste, both metals and non-metals, is facilitated by their separation in relatively clean condition for further processing.

(5) The paper fibers which now constitute a major portion of municipal refuse are reclaimed in a condition of sufficiently high quality for resale at prices which will significantly contribute to defraying the overall cost of municipal waste disposal.

(6) The invention can be practiced by means of suitably controlled combinations of selected equipment of currently conventional construction.

The last two of these advantages contribute a factor to the practice of the invention which makes it of significant importance to control the several separating steps in such manner as to assure the recovery of reusable paper fibers in a condition of relatively high quality. A complication in achieving this objective derives from the close relationship of particle size and specific gravity between many of the paper fibers and some of the common constituents of municipal refuse which would be contaminants if not eliminated from the reclaimed fibers. The invention therefore recognizes this problem and avoids it in practice by controlling the successive separating steps to eliminate a sufficiently large fraction of the fibrous materials at each stage to assure that adequate elimination of the contaminants is achieved. As a result, after complete processing over 25% of the fibers originally present in the refuse fed into the system have been rejected and depending upon the quality of fibers desired, this may run as high as 60%, although an optimum figure is approximately 40%.

Even though a relatively high percentage of paper fibers are rejected this does not represent a total loss. Thus if the rejects are used for the production of building board as described, the paper fibers will be the major constituent of that board, in combination with the plastic which binds them together. Furthermore, even if the rejects are ultimately burned, that operation is facilitated by the presence of the paper fibers, both in the manner in which they aid dewatering before burning, and also by reason of their inherent B.t.u. content. In this connection, it should also be noted that the reject prepared for incineration in the fluid bed reactor 71 can advantageously be mixed with sewage sludge and the resulting mixture then incinerated.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. A process for recovering fiber from refuse comprising:
   (a) depositing in a treatment vessel liquid and refuse including:
      (i) paper and other fibrous materials,
      (ii) nonfibrous organics, and
      (iii) inorganics
   (b) reducing relatively frangible portions of said refuse to less than a predetermined particulate size by subjecting said refuse in the presence of liquid to substantial and violent mechanical and hydraulic shear forces while in said vessel,
   (c) withdrawing from said vessel in slurry form said relatively frangible portions below said predetermined particulate size and a portion of said liquid,
   (d) removing substantially all of said inorganics from said slurry by centrifugal cleaning while leaving substantially all of the organic material with the centrifugally cleaned slurry,
   (e) screening from said centrifugally cleaned slurry by a relatively coarse screening operation the relatively coarse organic particles and a substantial portion of said paper fibers,
   (f) screening the coarsely screened slurry in a finer screen operation while effecting the acceptance of the majority of the paper fibers and rejecting a substantial portion of said fibers and of the other organic particles accepted in the preceding screening operation, and
   (g) so controlling the proportions of accepted and rejected material during said coarse and finer screening operations such that from about 25-60% of the paper fibers are rejected in said screening operations.

2. The process of claim 1 comprising the further step of removing from the material accepted in said coarse and finer screening operations a substantial portion of all particles having a maximum dimension of less than one millimeter and with paper fibers constituting the appreciable portion of such removed particles.

3. The process of claim 2 comprising the further step of centrifugally cleaning the accepted material under controlled conditions effecting the rejection of irregularly shaped partiles of organic materials similar to paper fibers in specific gravity and maximum dimension.

4. The process of claim 2 comprising the further step of performing a digestion operation on the accepted material effective to dissolve and disperse a substantial portion of any nonfibrous organics remaining therein.

5. A process for recovering fiber from refuse comprising:
   (a) depositing in a treatment vessel liquid and refuse including:
      (i) paper and other fibrous materials,
      (ii) nonfibrous organics, and
      (iii) inorganics
   (b) reducing relatively frangible portions of said refuse to less than a predetermined particulate size by subjecting said refuse in the presence of liquid to substantial and violent mechanical and hydraulic shear forces while in said vessel,
   (c) withdrawing from said vessel in slurry form said relatively frangible portions below said predetermined particulate size and a portion of said liquid,
   (d) removing substantially all of said inorganics from said slurry by centrifugal cleaning while leaving substantially all of the organic material with the centrifugally cleaned slurry, and
   (e) separating a substantial portion of the paper fibers from the other solid constituents of said slurry with in excess of 25% of the paper fibers being included with said other solid constituents of said slurry during the separating step.

6. The process of claim 5 wherein:
   (a) said separating step comprises including with said other solid constituents approximately 25-60% of the paper fibers.

7. The process of claim 6 wherein:
   (a) said separating step comprises including with said other solid constituents approximately 40% of the paper fibers.

8. A process for recovering fiber from refuse comprising:
   (a) depositing in a treatment vessel liquid and refuse including:
      (i) paper and other fibrous materials,
      (ii) nonfibrous organics, and
      (iii) inorganics
   (b) reducing relatively frangible portions of said refuse to less than a predetermined particulate size by subjecting said refuse in the presence of liquid to substantial and violent mechanical and hydraulic shear forces while in said vessel,
   (c) withdrawing from said vessel in slurry form said relatively frangible portions below said predetermined particulate size and a portion of said liquid,
   (d) removing substantially all of said inorganics from said slurry by centrifugal cleaning while leaving substantially all of the organic material with the centrifugally cleaned slurry,
   (e) screening said centrifugally cleaned slurry,
   (f) during said screening step rejecting approximately 25-60% of paper fibers in said slurry, and
   (g) directing the resulting screened slurry at relatively low consistency through a refiner operating at relatively close tackle clearances.

9. The process of claim 8 further comprising:
   (a) directing said slurry from said refiner to a flotation tank, and
   (b) separating papermaking fibers from other constituents of said slurry in said flotation tank.

10. The process of claim 9 further comprising:
    (a) centrifugally cleaning said papermaking fibers from said flotation tank.

11. The process of claim 8 further comprising:
    (a) centrifugally cleaning said slurry from said refiner.

12. The process of claim 8 wherein:
    (a) said slurry is directed through said refiner at .10% to 1% consistency.

13. The process of claim 8 wherein: (a) said tackle clearances are less than .020 inch.

References Cited
UNITED STATES PATENTS

| | | | |
|---|---|---|---|
| 3,549,092 | 12/1970 | Baxter, Jr. | 241—15 |
| 3,016,323 | 1/1962 | Altmann et al. | 162—4 |
| 3,339,851 | 9/1967 | Felton et al. | 241—46.17 |
| 1,593,491 | 7/1926 | Gerson | 162—55 X |
| 3,507,742 | 4/1970 | Rice | 162—5 |
| 3,367,495 | 2/1968 | Lea et al. | 162—55 X |

S. LEON BASHORE, Primary Examiner

A. D'ANDREA Jr., Assistant Examiner

U.S. Cl. X.R.

162—55, 189; 241—15, 24